United States Patent
Lockyer et al.

[11] Patent Number: 6,021,570
[45] Date of Patent: Feb. 8, 2000

[54] ANNULAR ONE PIECE COMBUSTOR LINER

[75] Inventors: John F. Lockyer, La Jolla; Kenneth W. Maden, Coronado, both of Calif.

[73] Assignee: Caterpillar Inc., Peoria, Ill.

[21] Appl. No.: 09/132,647

[22] Filed: Aug. 11, 1998

Related U.S. Application Data

[62] Division of application No. 08/974,795, Nov. 20, 1997, abandoned.

[51] Int. Cl.[7] .................................................. B23P 15/00
[52] U.S. Cl. ................................. 29/890.01; 29/889.2
[58] Field of Search ............................... 29/889.2, 889.4, 29/890.01, 889.3; 60/39.36, 752, 757, 755

[56] References Cited

U.S. PATENT DOCUMENTS

| | | | |
|---|---|---|---|
| 2,525,206 | 10/1950 | Clarke | 60/44 |
| 2,548,485 | 4/1951 | Lubbock | 29/889.2 |
| 3,082,603 | 3/1963 | Hering et al. | 60/39.65 |
| 3,737,152 | 6/1973 | Wilson | 60/39.66 |
| 4,177,637 | 12/1979 | Pask | 60/39.36 |
| 4,785,623 | 11/1988 | Reynolds | 60/39.32 |
| 4,878,283 | 11/1989 | Mclean | 29/889.2 |
| 5,501,011 | 3/1996 | Pellet | 29/890.01 |
| 5,613,299 | 3/1997 | Ring et al. | 29/890.01 |
| 5,836,075 | 11/1998 | Fitzgerald et al. | 29/889.2 |

*Primary Examiner*—Irene Cuda
*Attorney, Agent, or Firm*—Larry G. Cain

[57] ABSTRACT

Present combustion liners are used to form combustors in which fuel and air are burned and heat energy is directed to a turbine. The construction of the present combustion liners reduces manufacturing cost by reducing assembly time and processing time. An inner and outer liner portion is formed from a single sheet into a generally cylindrical tube. The tube is formed, by a spin forming operation to include a plurality of generally axial portions being interconnected by a plurality of transition portions. The transition portions have a plurality of openings therein to be used for cooling the combustion liner portions. The transition portions also act as stiffeners to support the generally cylindrical configuration of the tube.

6 Claims, 4 Drawing Sheets

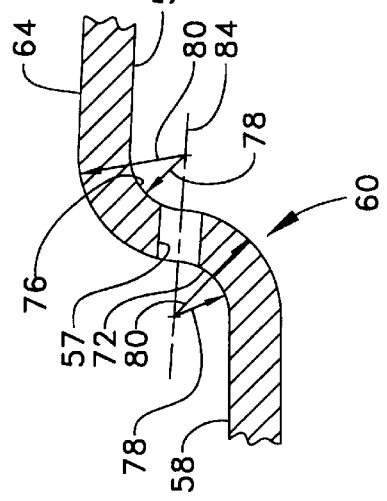
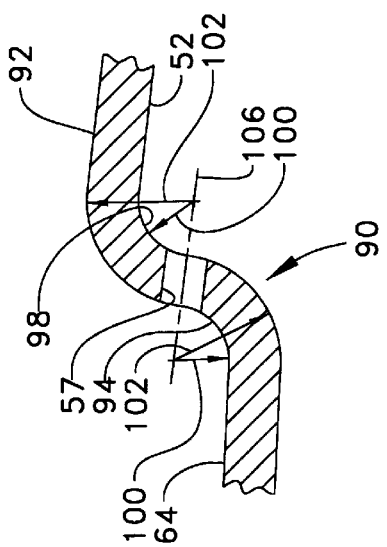
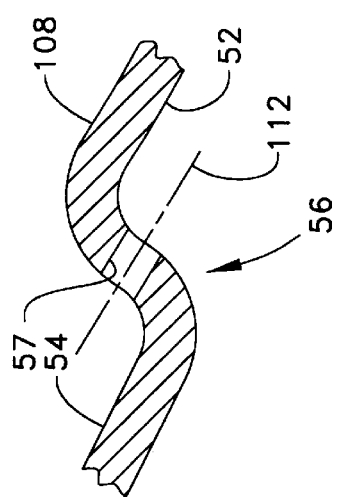
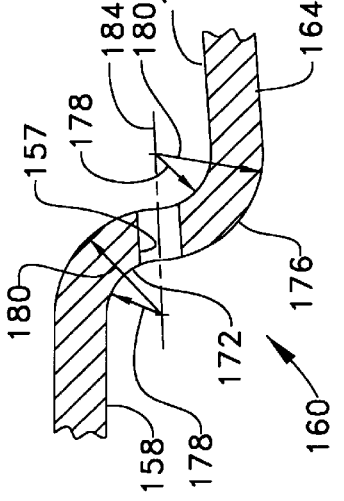
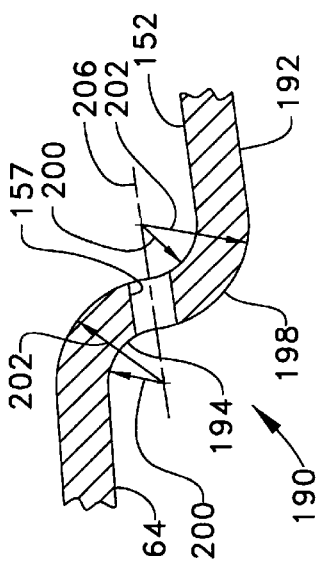
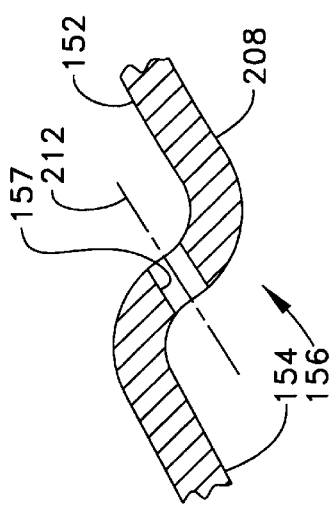

ANNULAR ONE PIECE COMBUSTOR LINER

This is a divisional application of Application Ser. No. 08/974,795, filed Nov. 20, 1997, now abandoned.

TECHNICAL FIELD

This invention relates generally to gas turbine engine and more particularly to an improved one piece annular combustor liner for use with the gas turbine engine.

BACKGROUND ART

High performance gas turbine engines require increased firing temperatures and increased compressor pressures. Coolant from the compressor section is directed through cooling passages and to various components to enhance reliability and cycle life of individual components within the engine. For example, to improve fuel economy characteristics engines are being operated at higher temperatures than the material physical property limits of which the engine components are constructed. These higher temperatures, if not compensated for, oxidize engine components, distort engine components and decrease component life. Cooling passages are used to direct a flow of air to such engine components to reduce the high temperature of the components and prolong component life by limiting the temperature to a level which is consistent with material properties of such components.

Conventionally, as shown in U.S. Pat. No. 5,297,385 to Thomas L. Dubell et al, issued Mar. 29, 1994 a combustion chamber is manufactured of a plurality of generally cylindrical or conical segments. Each of the segments are axially connected to form a combustion chamber. The segments are usually riveted or welded to structurally form the combustion chamber. The forming of the segments, positioning of the segments, and riveting and/or welding each of the segments to form a combustor assembly is a time consuming and cost intensive process.

The present invention is directed to overcome one or more of the problems as set forth above.

DISCLOSURE OF THE INVENTION

In one aspect of the present invention, a combustion liner is comprised of a single unitary sheet being formed about an axis into a tube having a generally cylindrical configuration. The generally cylindrical tube has an outlet end, an inlet end, a first surface and a second surface being radially inward of the first surface. The generally cylindrical configuration includes a plurality of generally axial portions being interconnected by a plurality of transition portions. The plurality of generally axial portions have a first generally axial portion positioned near the inlet end. The plurality of generally axial portions have a second generally axial portion spaced from the first generally axial portion and have a first transition portion extending therebetween, at least one of said first generally axial portion and the second generally axial portion are angled to the central axis. The plurality of generally axial portions have a third generally axial portion and have a second transition portion extending between the second generally axial portion and the third generally axial portion, the third generally axial portion is angled to the second generally axial portion and to the central axis. At least a portion of the plurality of transition portions have a plurality of openings positioned therein. Each of said plurality of openings have an axis being substantially parallel to the second surface of the respective one of the plurality of generally axial portions.

In another aspect of the invention, a method of making a combustion liner includes the following steps. Forming a unitary sheet into a tube having a generally cylindrical configuration. Positioning the tube within a spin forming machine. Forming a plurality of generally axially portions being interconnected by a plurality of transition portions. And, forming a plurality of openings in the combustion liner.

BRIEF DESCRIPTION OF THE DRAWINGS

FIG. 4 is an enlarged sectional view taken along line 4 of FIG. 2;

FIG. 5 is an enlarged sectional view taken along line 5 of FIG. 2;

FIG. 6 is an enlarged sectional view taken along line 6 of FIG. 2;

FIG. 7 is an enlarged sectional view taken along line 7 of FIG. 2;

FIG. 8 is an enlarged sectional view taken along line 8 of FIG. 2; and

FIG. 9 is an enlarged sectional view taken along line 9 of FIG. 2.

BEST MODE FOR CARRYING OUT THE INVENTION

Figure 1:
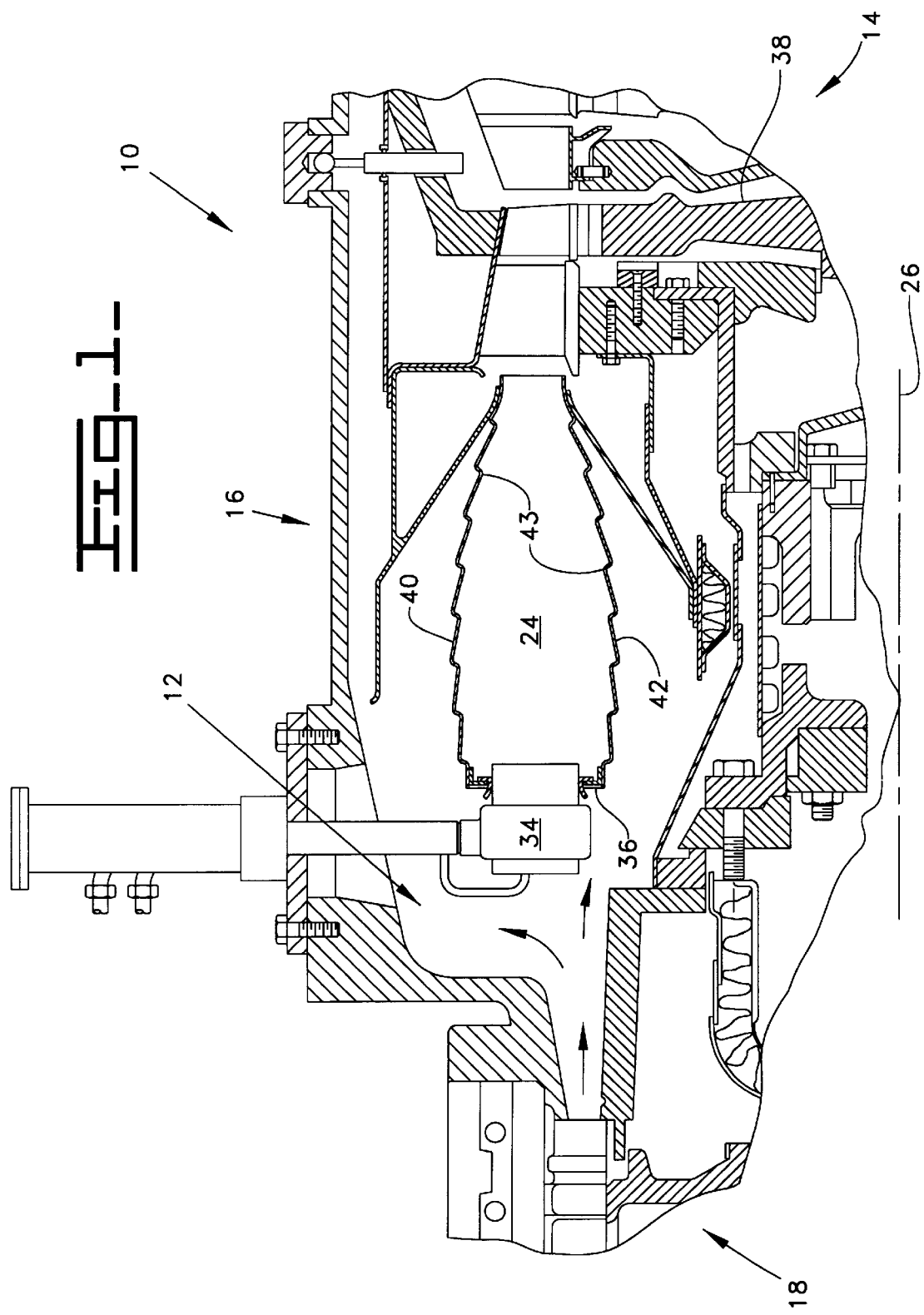
FIG. 1 is a partially sectioned partial view of a gas turbine engine embodying the present invention.

Referring to FIG. 1, a gas turbine engine 10 is shown but not in its entirety. The gas turbine engine 10 includes an air flow delivery system 12 for providing combustion air and for providing cooling air for cooling components of the engine 10. The engine 10 includes a turbine section 14, a combustor section 16 and a compressor section 18. The combustor section 16 and the compressor section 18 are operatively connected to the turbine section 14. In this application the combustor section 16 includes an annular combustion chamber 24 being positioned about a central axis 26 of the gas turbine engine 10. As an alternative this could include a plurality of can combustors without changing the essence of the invention. The annular combustion chamber 24 is operative positioned between the compressor section 18 and the turbine section 14. A plurality of fuel nozzles 34 (one shown) are positioned in an inlet end portion 36 of the annular combustion chamber 24. The turbine section 14 includes a first stage turbine 38 being centered about the central axis 26.

Figure 2:
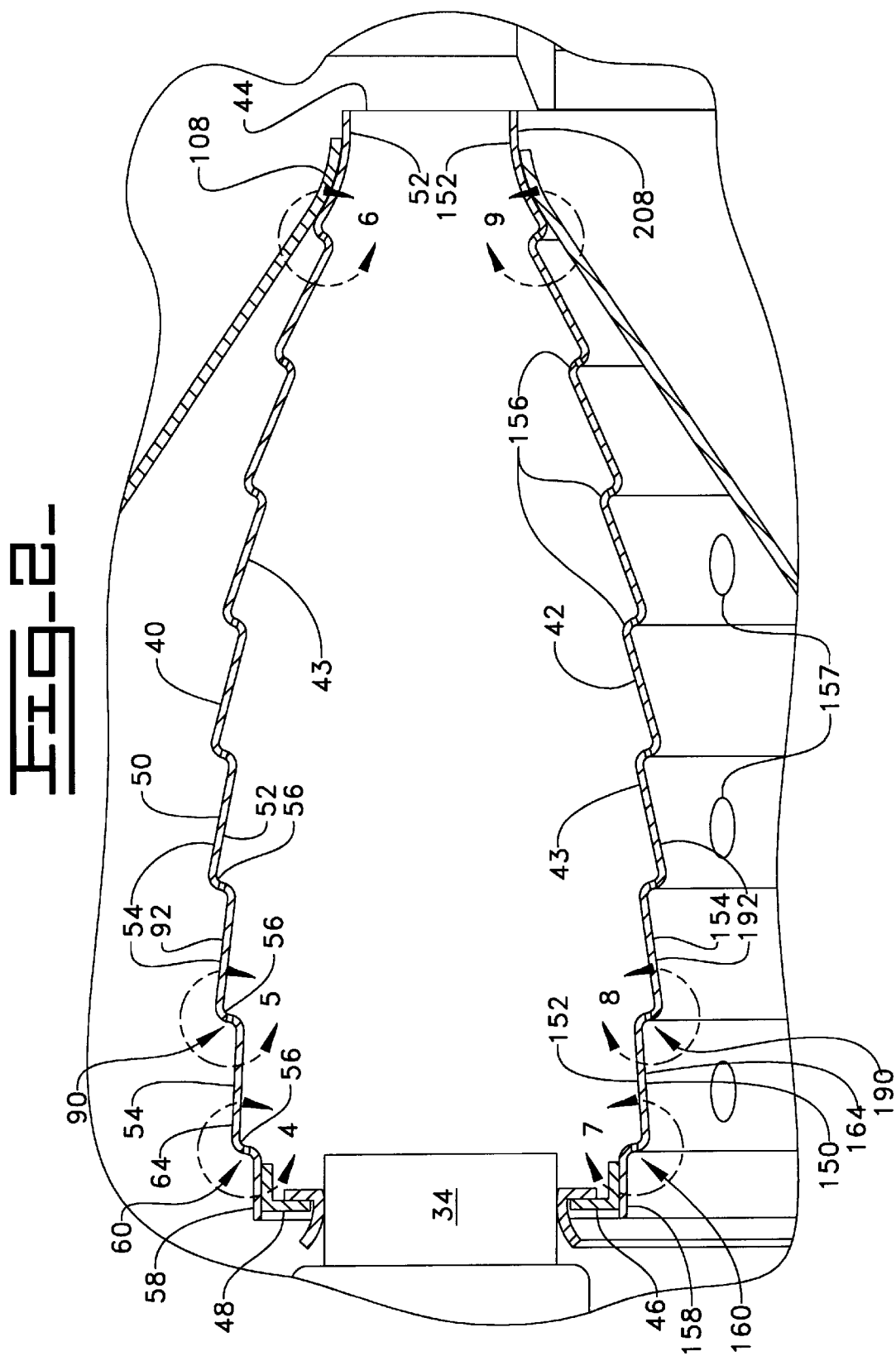
FIG. 2 is an enlarged sectional side view of a combustion liner embodying the present invention.
Figure 3:
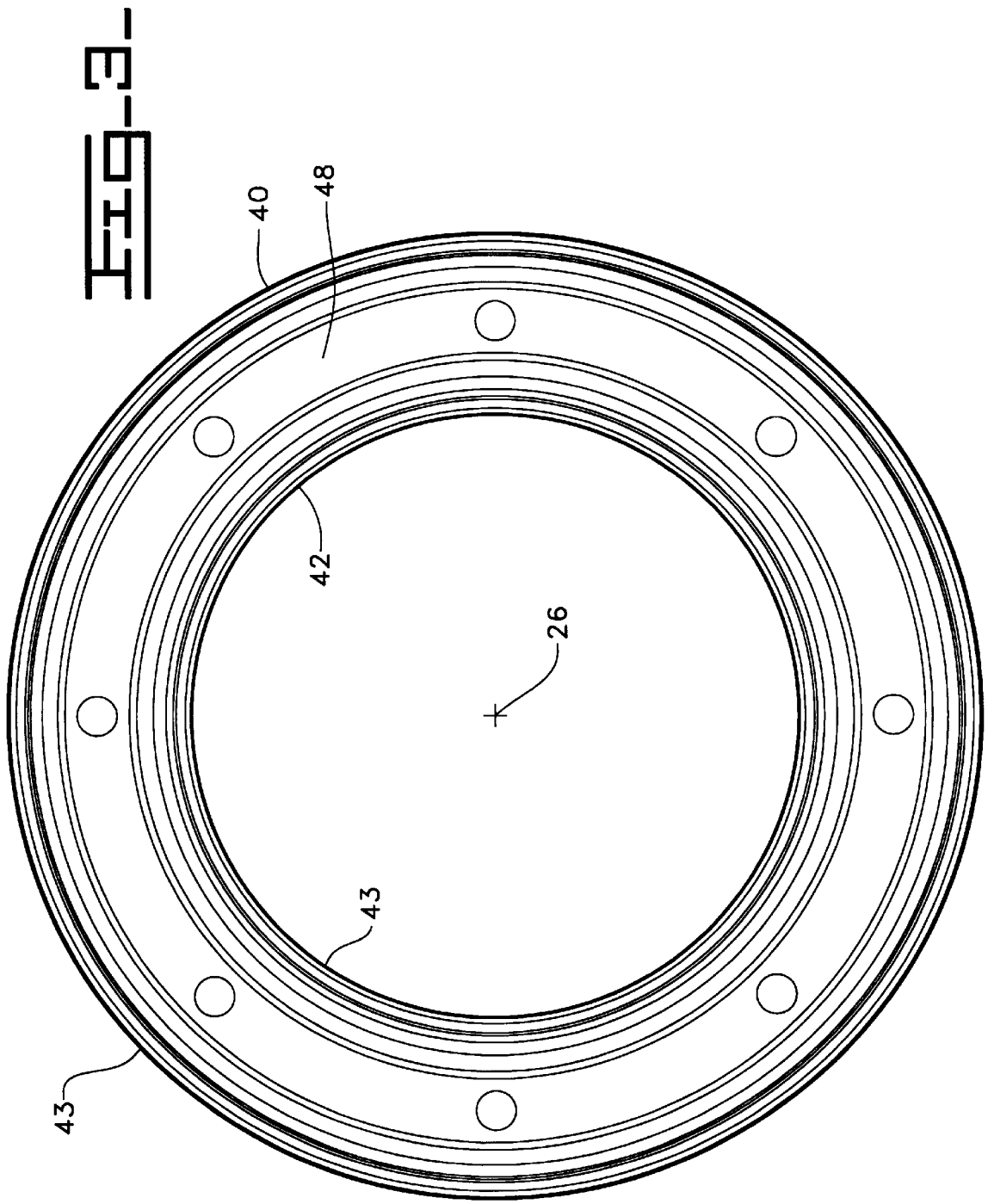
FIG. 3 is an enlarged end view of the combustion liners embodying the invention.

As best shown in FIG. 2, the annular combustion chamber 24 is enclosed by an outer liner portion 40 and an inner liner portion 42 being spaced therefrom a preestablished distance. Each of the outer and inner liner portions 40,42 are formed from a single unitary sheet into a tube 43 having a generally cylindrical configuration. The outer liner portion 40 and the inner liner portion 42 each have an outlet end 44 and an inlet end 46. The spacing between the outer liner portion 40 and the inner liner portion 42 as measured axially varies in value. For example, in this application, near the inlet ends 46 the outer liner portion 40 is radially spaced about 110 mm from the inner liner portion 42, as we travel axially toward the outlet ends 44 and about midway between the inlet ends 46 and the outlet ends 44 the outer liner portion 40 is radially spaced about 125 mm from the inner liner portion 42 and as we near the outlet ends 44 the outer liner portion 40 is radially spaced about 55 mm from the inner liner portion 42. The inlet ends 46 are connected by a shell 48 in which the plurality of fuel nozzles 34 are positioned. The outer liner portion 40 has a thickness defining a first surface 50 and a second surface 52 which in this application is radially inward of the first surface 50. The outer liner portion 40 includes a plurality of generally axial portions 54 and a plurality of transition portions 56 which interconnect the generally axial portions 54. Furthermore, each of the plurality of transition portions 56 include a plurality of openings 57. As an alternative, only a portion of the plurality of transition portions 56 could have the plurality of openings 57 therein. As a further alternative, a portion of the plurality of openings 57 could be positioned in the plurality of generally axial portions 54. And, as a further alternative, the size or area of individual ones of the plurality of openings 57 could be of different sizes, areas and shapes.

The outer liner portion 40, starting from the inlet end 46 and best shown in FIG. 4, Includes a first generally axial portion 58 being generally parallel to the central axis 26 and having a first transition portion 60 outwardly extending therefrom and a second generally axial portion 64 extending generally at an angle being about 5 degrees less than a 180 degree angle to the first generally axial portion 58. The first transition portion 60 includes a first arcuate portion 72 extending from the first generally axial portion 58 and a second arcuate portion 76 extending from the first arcuate portion 72 and connecting with the second generally axial portion 64. The first and second arcuate portions 72,76 are formed by an inner radius 78 having a preestablished dimension and an outer radius 80 having a preestablished dimension. The outer radius 80, in this application, includes the sum of the inner radius 78 dimension and the thickness. This results in the material thickness being uniform along the first generally axial portion 58, the transition portion 60 and the second generally axial portion 64. The transition portion 60 has a portion of the plurality of openings 57, only one being shown, defined therein having an axis 84. Each of the axis 84 of the portion of the plurality openings 57 is substantially parallel to the second surfaces 52 of the second generally axial portion 64. The outer liner portion 40, as best shown in FIG. 5, further includes a second transition portion 90 outwardly extending from the second generally axial portion 64 and connects with a third generally axial portion 92 extending generally at an angle being about 5 degrees less than a 180 degree angle to the second generally axial portion 64. The second transition portion 90 includes a first arcuate portion 94 extending from the second generally axial portion 64 and a second arcuate portion 98 extending from the first arcuate portion 94 and connecting with the third generally axial portion 92. The first and second arcuate portions 94,98 are formed by an inner radius 100 having a preestablished dimension and an outer radius 102 having a preestablished dimension. The outer radius 102, in this application, includes the sum of the inner radius 100 dimension and the thickness. The second transition portion 90 has a portion of the plurality of openings 57 therein, only one being shown, defined therein having an axis 106. Each of the axis 106 of the portion of the plurality of openings 57 is substantially parallel to the second surfaces 52 of the third generally axial portion 92. The outer liner portion 40, as best shown in FIG. 6, further includes additional ones of the plurality of transition portions 56 and generally axial portions 54 lineally positioned in connecting relationship and ending with a last generally axial portion 108 at the outlet end 44. Each of the plurality of transition portions 56 includes a portion of the plurality of openings 57, only one being shown, having an axis 112. Each of the axis 112 of the portion of the plurality of openings 57 is substantially parallel to the second surface 52 of the respective generally axial portion 108.

The inner liner portion 42 has a thickness defining a first surface 150 and a second surface 152 which in this application is radially outward of the first surface 150. The inner liner portion 42 includes a plurality of generally axial portions 154 and a plurality of transition portions 156 which interconnect generally axial portions 154. Furthermore, each of the plurality of transition portion 156 include a plurality of openings 157. As an alternative, only a portion of the plurality of transition portions 156 could have the plurality of openings 157 therein. As a further alternative, a portion of the plurality of openings 157 could be positioned in the plurality of generally axial portions 154 as shown in phantom in the inner liner portion of FIG. 2. And, as a further alternative, the size or area of individual ones of the plurality of openings 157 could be of different sizes, areas and shapes.

The inner liner portion 42, starting from the inlet end 46 and best shown in FIG. 7, includes a first generally axial portion 158 being generally parallel to the central axis 26 and having a first transition portion 160 inwardly extending therefrom and a second generally axial portion 164 extending generally at an angle being about 5 degrees less than a 180 degree angle to the first generally axial portion 158. The first transition portion 160 includes a first arcuate portion 172 extending from the first generally axial portion 158 and a second arcuate portion 176 extending from the first arcuate portion 172 and connecting with the second generally axial portion 164. The first and second arcuate portions 172,176 are formed by an inner radius 178 having a preestablished dimension and an outer radius 180 having a preestablished dimension. The outer radius 180, in this application, includes the sum of the inner radius 178 dimension and the thickness. This results in the material thickness being uniform along the first generally axial portion 158, the first transition portion 160 and the second generally axial portion 164. The first transition portion 160 has a portion of the plurality of openings 157, of which only one is shown, defined therein having an axis 184. Each of the axis 184 of the portion of the plurality openings 157 is substantially parallel to the second surfaces 152 of the second generally axial portion 164. The inner liner portion 42, as best shown in FIG. 8, further includes a second transition portion 190 outwardly extending from the second generally axial portion 164 and connects with a third generally axial portion 192 extending generally at an angle being about 5 degrees less than a 180 degree angle to the third generally axial portion 192. The second transition portion 190 includes a first arcuate portion 194 extending from the second generally axial portion 164, a second arcuate portion 198 extending from the first arcuate portion 194 and connecting with the third generally axial portion 192. The first and second arcuate portions 194,198 are formed by an inner radius 200 having a preestablished dimension and an outer radius 202 having a preestablished dimension. The outer radius 202, in this application, includes the sum of the inner radius 200 dimension and the thickness. The second transition portion 190 has a portion of the plurality of openings 157, of which only one is shown, defined therein having an axis 206. Each of the axis 206 of the portion of the plurality openings 157 is substantially parallel to the second surfaces 152 of the third generally axial portion 192. The inner liner portion 42, as best shown in FIG. 9, further includes additional ones of the plurality of transition portions 156 and generally axial portions 154 lineally positioned in connecting relationship and ending with a last generally axial portion 208 at the outlet end 44. Each of the plurality of transition portions 156 include a portion of the plurality of openings 157 having an axis 212. Each of the axis 212 of the portion of the plurality of openings 157 is substantially parallel to the second surface 152 of the respective generally axial portion 208.

Each of the outer liner portion 40 and the inner liner portion 42 are of a unitary construction. For example, to make the outer and inner liner portion 40,42 a single sheet is rolled into the tube 43 having the generally cylindrical configuration and the abutting ends are connected, such as by welding. The resulting cylindrical tube 43 having a wall thickness and a given diameter is mounted into a conventional spin rolling machine. Appropriate tooling is positioned within the rolling machine and contacts the workpiece on the outer or inner liner portions 40,42. The outer and inner liner portions 40,42 are worked from both or either the first surface 50,150 and the second surface 52,152. The unitary outer liner portion 40 and the unitary inner liner portion 42 are formed to include the plurality of generally axial portions 54,154 and the plurality of transition portions 56,156. After being formed the unitary outer liner portion 40 and the unitary inner liner portion 42 has the plurality of openings 57,157 formed therein, such as by laser drilling, so that the axis 84,184,106,206,112,212 are substantially parallel with the second surfaces 52,152 of corresponding ones of the generally axial portions 54,154.

The resulting unitary structural configured tube 43 of the outer generally cylindrical liner portion 40 and the inner generally cylindrical liner portion 42 eliminates the necessity to form individual segments, position the segments, and rivet and/or weld each of the segments to form a combustor assembly, which is a timely and cost intensive process.

INDUSTRIAL APPLICABILITY

In operation, the turbine engine 10 is started and brought up to operating speed and temperature. The flow of air from the air flow delivery system 12 is used to supply combustion air and air to cool components of the gas turbine engine 10.

After the unitary sheet has been formed into a generally cylindrical tube 43, the tube 43 is positioned in a spin rolling machine to form either the outer liner portion 40 or the inner liner portion 42. The resulting inner and outer liner portions 42,40 have the inlet end 46, the outlet end 44 and the plurality of generally axial portions 54,154 interconnected by the plurality of transition portions 56,156. After being formed with the plurality of generally axial portions 54,154 and the plurality of transition portion 56,156 the plurality of opening 57,157 are formed in the plurality of transition portions 56,156 and, if desired, in a portion of the plurality of generally axial portions 54,154.

The outer and inner liner portions 40,42 are combined with the shell 48 and installed in the gas turbine engine 10. Air from the air flow delivery system 12 passes through the plurality of openings 57,157 and travel along the second surface 52,152 to cool the inner and outer liner portions 42,40. The positioning of the axis 84,184,106,206,112,212 of the plurality of openings 57,157 parallel to the second surface 52,52 provides a film of cooling air interposed the second surface 52,152 of the outer and inner liner portions 40,42 and the combustion zone within the combustion chamber 24. The cooling air enters the Plurality of openings 57,157 travels along the second surface 52,152 cooling the outer and inner liner portions 40,42 increasing life of the outer and inner liners 40,42. After preforming the cooling function, the air mixes with the fuel and combustion air and is further used to support combustion.

Thus, the primary advantages of the improved one piece annular combustor liner portions 40,42 is in the ease of manufacturing and the simplicity of the apparatus. The unitary construction eliminated manufacturing steps, such as positioning, welding or riveting. Furthermore, the structural configuration enables the plurality of transition portions 56,156 to be used as stiffeners while they further allow positioning of the plurality of cooling openings 57,157 therein which are parallel and as close as possible to the inner surfaces 52,152 to insure uniform cooling of the inner surfaces 52,152 along each of the plurality of generally axial portions 54,154. Thus, the improved method and apparatus, reduces manufacturing costs and complexity, and maintains component life.

Other aspects, objects and advantages of this invention can be obtained from a study of the drawings, the disclosure and the appended claims.

We claim:

1. A method of making a combustion liner including the following steps:

a) forming a unitary sheet into a tube having a generally cylindrical configuration;

b) positioning the tube within a spin forming machine;

c) forming a plurality of generally axially portions being interconnected by a plurality of transition portions; and d) forming a plurality of openings in the combustion Liner.

2. The method of forming a combustion liner of claim 1 wherein said step of forming the unitary sheet into the tube includes welding the ends of the unitary sheet.

3. The method of forming a combustion liner of claim 1 wherein said step of forming the plurality of generally axially portions being interconnected by the plurality of transition portions includes having the plurality of generally axial portions at an angle one to another.

4. The method of forming a combustion liner of claim 1 wherein said step of forming a plurality of openings in the combustion liner includes forming the plurality of openings in each of the plurality of transition portions.

5. The method of forming a combustion liner of claim 1 wherein said step of forming a plurality of openings in the combustion liner includes forming the plurality of openings in only a portion of the plurality of transition portions.

6. The method of forming a combustion liner of claim 1 wherein said step of forming a plurality of openings in the combustion liner includes forming a portion of the plurality of openings in the plurality of generally axial portions.

\* \* \* \* \*

UNITED STATES PATENT AND TRADEMARK OFFICE
CERTIFICATE OF CORRECTION

PATENT NO. : 6,021,570
DATED : February 8, 2000
INVENTOR(S) : John F. Lockyer, Kenneth W. Maden It is certified that error appears in the above-identified patent and that said Letters Patent is hereby corrected as shown below:

Assignee should be: Solar Turbines Incorporated
2200 Pacific Highway
San Diego, California Signed and Sealed this Eleventh Day of September, 2001

Attest:

*Nicholas P. Godici*

NICHOLAS P. GODICI
*Attesting Officer*       *Acting Director of the United States Patent and Trademark Office*